United States Patent [19]

Leopold, Jr. et al.

[11] 3,815,859

[45] June 11, 1974

[54] GAS METER SETTING OR THE LIKE

[76] Inventors: Wilbur R. Leopold, Jr., 29 Country Club Rd., Decatur, Ill. 62521; John J. Smith, deceased, late of 69 Country Club Rd., Decatur, Ill. 62521 by Beatrice A. Smith, Executrix

[22] Filed: Sept. 21, 1972

[21] Appl. No.: 291,028

Related U.S. Application Data

[62] Division of Ser. No. 175,312, Aug. 26, 1971.

[52] U.S. Cl. .................. 248/300, 285/30, 285/61
[51] Int. Cl. ........................................... F16m 13/00
[58] Field of Search ............... 248/43, 65, 251, 300; 285/30, 61

[56] References Cited
UNITED STATES PATENTS

| | | | |
|---|---|---|---|
| 1,072,204 | 9/1913 | Boehm | 248/251 X |
| 1,343,445 | 6/1920 | Gaffers | 248/300 X |
| 1,654,270 | 12/1927 | Powell | 248/251 X |
| 2,575,254 | 11/1951 | Blaugrund | 248/43 |
| 3,414,219 | 12/1968 | Siegel | 248/65 |
| 3,746,371 | 7/1973 | Leopold et al | 285/30 |

FOREIGN PATENTS OR APPLICATIONS 34,569 8/1934 Netherlands.................... 248/300

Primary Examiner—William H. Schultz
Attorney, Agent, or Firm—Cushman, Darby & Cushman

[57] ABSTRACT

A fluid meter setting or installation for gas meters or the like, the setting permitting the fluid supply line to be connected to a service line of a dwelling or the like while rigidly supporting the meter against torsion. The setting includes a simplified sheet metal bracket capable of being attached to a wall or post, the bracket permitting the use of conventional elbows and straight meter swivel members for properly orienting or supporting the meter. The bracket which is made from identical parts may be assembled at the point of manufacture or may be shipped to the user in nested arrangement of the parts and then assembled at the site, thus, reducing manufacturing and shipping costs. The setting and the bracket are so designed as to eliminate all possibility of gas theft.

6 Claims, 6 Drawing Figures

PATENTED JUN 11 1974 3,815,859

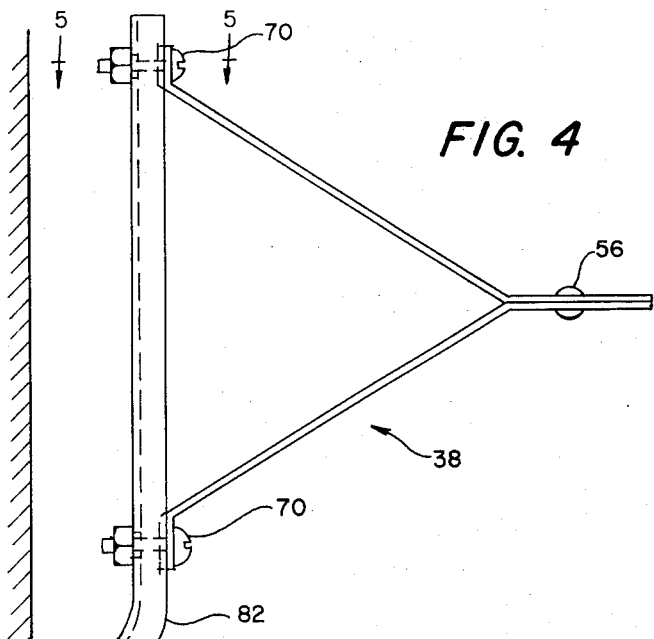
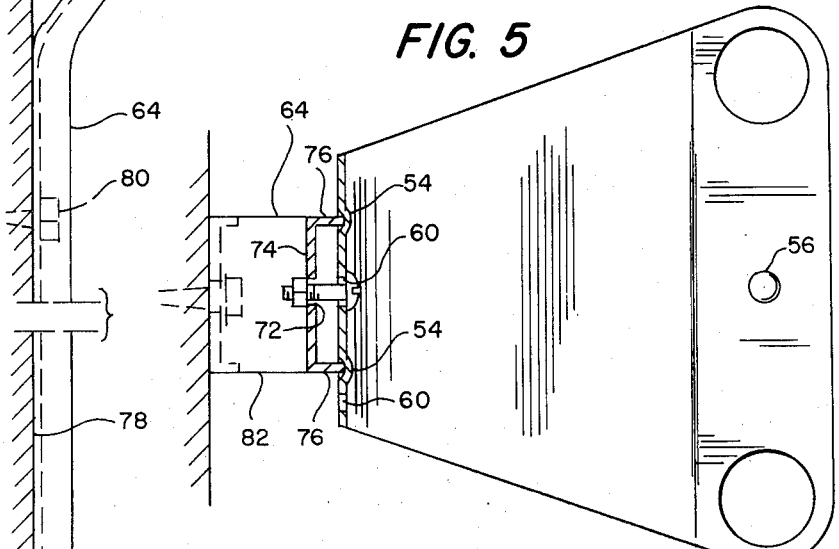
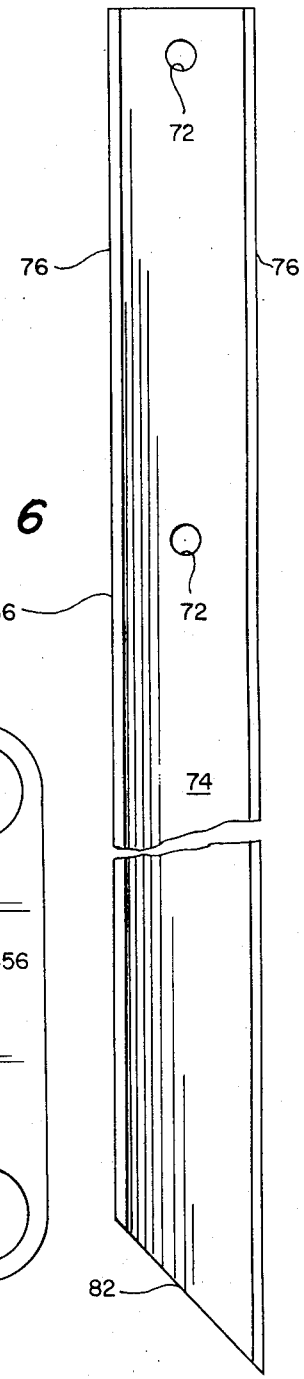

GAS METER SETTING OR THE LIKE

This is a division, of application, Ser. No. 175,312, filed Aug. 26, 1971.

The present invention relates to an improved fluid meter installation or setting for gas meters or the like and, more particularly, to an improved bracket made from sheet metal and capable of supporting the meter rigidly against any torsional loads exerted thereon by ground loads on the supply line or by weight of the meter itself on the supply and service lines. Ancillary, the invention relates to a meter setting which eliminates the use of a rigid meter bar and yet enables quick removing and replacing of a meter.

BACKGROUND OF THE INVENTION

The conventional meter setting heretofore used to support a fluid meter such as a gas meter or the like and to operatively connect the supply line to the service line of a dwelling or the like through the meter, included a rigid meter bar supported from a wall of the dwelling or from a post. The rigid meter bar is a quite expensive item to manufacture as it is usually cast from iron or other metal and it has an inlet fitting elbow and an outlet fitting or elbow integrally cast thereon. The meter bar between the inlet fitting and outlet fitting is quite thick in cross-section in an effort to provide the necessary rigidity to the setting and it is necessary to support this bar from a wall or a post by means of a bracket attached to the meter bar by a single bolt. Usually special fittings are incorporated in the setting in order to properly orient the meter with respect to the supply line and the service line.

In recent years the gas distribution industry has been experiencing considerable gas theft in meter settings utilizing the cast rigid meter bar. In this respect, holes have been drilled longitudinally through the solid meter bar from the inlet fitting to the outlet fitting so that a portion of the gas being supplied by-passes the meter completely. Such thefts are difficult to detect immediately unless the meter happens to be serviced by Service personnel. About the only means a gas company has of detecting such gas thefts is when the gas company notices, over a period of time, that gas supplied to an area is more than gas billed to customers in that area. The companies must then inspect all meters in the area because they would have no other way of detecting the particular offenders.

While the gas distribution industry has in the past almost universally used meter settings incorporating the ridig cast meter bar, there have been efforts made to eliminate the meter bar, but these prior efforts have been either too expensive to manufacture and install or they have not been rigid enough to resist torsion loads on the setting caused by ground loads on the supply lines or by weight of the meter itself.

The following patents represent prior art meter settings discussed above:

| NUMBER | NAME | DATE |
|---|---|---|
| 303,858 | (Italian) | Dec. 3, 1931 |
| Re.26,191 | McDowell | Apr. 18, 1967 |
| 3,187,570 | Mueller | June 8, 1965 |
| 3,296,860 | Smith et al. | Jan. 10, 1967 |

Of the above patents, U.S. Pat. Nos. 3,187,570 and 3,296,860 disclose meter settings utilizing the more or less conventional rigid cast meter bar with integral inlet and outlet fittings cast thereon. Reissue U.S. Pat. No. 26,191 discloses a meter setting utilizing a complex bracket arrangement requiring special inlet and outlet pipes for connecting the meter between the supply line and the service line. The Italian patent No. 303,858 discloses a meter setting utilizing a bracket mounted to a support means, the bracket supporting the meter but the arrangement does not provide for resistance to torsion loads in all directions as it has a single point suspension with the support means and the inlet and outlet fittings are not completely encompassed by the bracket.

BRIEF DESCRIPTION OF THE INVENTION

The present invention is an improved meter setting for gas meters or the like and comprises an improved meter support bracket made from galvanized sheet metal to eliminate special corrosive prevention treatments. The improved meter support bracket permits the setting to be attached to a wall or to a special post supported on the wall or driven into the ground. In either instance of attachment, the setting, because of the attachment of and design of the bracket and manner of support of the meter, is more rigid in torsion in all directions than settings heretofore used or proposed. By eliminating the rigid meter bar, the improved meter support bracket is capable of supporting the meter with conventional or ordinary pipe elbows and straight meter swivel members and thus the meter may be easily oriented with repsect to the supply line and the service line The improved meter support bracket is made from two sheets of sheet metal by simple stamping, the sheets being identical, and by their specific design the sheets may be easily assembled to form a rigid bracket or they may be shipped in nested fashion to the site of use and then assembled.

BRIEF DESCRIPTION OF THE DRAWINGS

FIG. 1 is a perspective view of a meter setting of the present invention and disclosing the same mounted on a wall of a swelling or the like;

FIG. 4 is a side elevational view of the meter support bracket of the present invention mounted on a special post secured to a wall or a foundation of a dwelling or the like;

FIG. 5 is a sectional view taken on the 5—5 of FIG. 4; and

FIG. 6 is a front elevational view illustrating a modified post for mounting the improved meter support bracket in the meter setting of the present invention, the post being capable of driving into the ground.

DETAILED DESCRIPTION OF THE INVENTION

Figure 1:
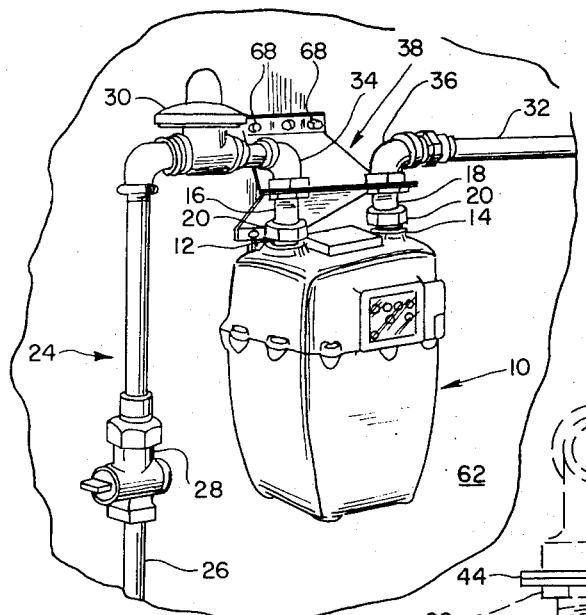

Referring now to the drawings wherein like character or reference numerals represent like or similar parts, there is disclosed a conventional gas meter 10 having an exteriorly threaded inlet 12 and an exteriorly threaded outlet 14. The inlet 12 and outlet 14 have respectively straight meter swivel members 16 and 18 respectively extending therefrom, the meter swivel members 16 and 18 being provided with unions 20 for threading onto the inlet and outlets 12 and 14. The upper free ends of the straight meter swivel members 16 and 18 are exteriorly threaded and are each provided with a jam nut 22 threaded thereon. The jam nuts' purpose will be described in more detail later in the specification.

A gas supply line generally designated at 24 includes a conventional riser pipe 26 extending from a source of gas supply, the riser pipe being provided with a meter stop or valve 28 and a pressure regulator 30. A service line 32 extends to the points of use in a dwelling or the like. A conventional pipe elbow 34 is connected to the supply line 26 and to the exteriorly threaded end of the meter swivel member 16 to supply gas to the meter whereas a conventional elbow 36 is connected to the exteriorly threaded end of the meter swivel member 18 and to the service line 32 for receiving gas from the meter and supplying the same to points of use in the dwelling.

In order that the meter 10 may be rigidly supported with respect to the supply line 26 and service line 32 and, thus, provide a rigid setting, there is provided an improved meter support bracket generally designated at 38. In more detail, the meter support bracket 38 is made from 16 gauge galvanized sheet metal parts 40 and 42 which are identical in shape and which are formed by stamping. The parts 40 and 42 of the bracket 38 when rigidly secured together define a horizontally extending meter support member 44 of double thickness of sheet metal, and a pair of diverging legs 46 and 48 extending from the respective thicknesses of the meter support member. Each leg 46 and 48 has at its free end a vertically extending flange 50 and 52 respectively, the flanges 50 and 52 lying in the same vertical plane and in a plane transverse to the plane of the meter support member 44. Each flange 50 and 52 is provided with a pair of horizontally spaced vertically extending stiffening ribs 54 pressed therefrom from the rearside thereof, the pair of stiffening ribs 54 of the flange 50 being in vertical alignment with a pair stiffening ribs 54 of flange 52.

Figure 3:
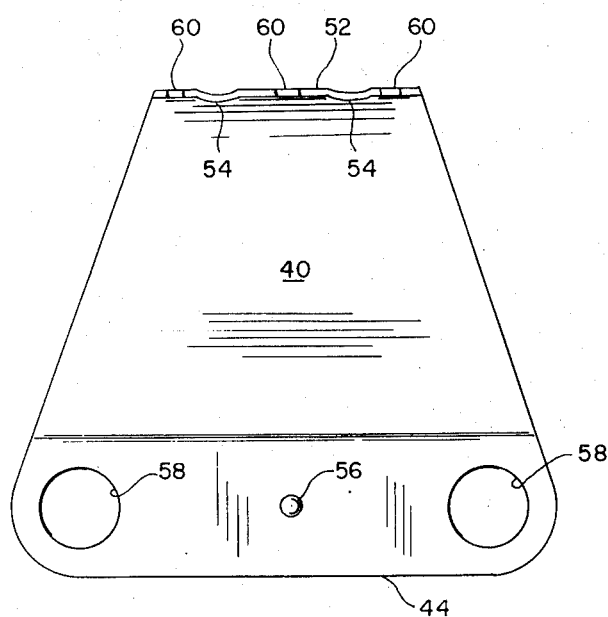
FIG. 3 is a top plan view of the improved meter support bracket.

It will be noted by reference to FIGS. 3, 4 and 5 that the double thicknesses of the horizontally extending meter support member of bracket 38 are rigidly secured together by at least one rivet 56 and thus the portion of the bracket to which the elbows 34 and 36 and meter swivel members 16 and 18 is sufficiently strong to support the weight of the meter 10. While the meter support member 44 could be made by folding a single sheet of metal into the configuration shown, it is preferable to make the bracket from the two parts 40 and 42 as the bending operation is eliminated and there is only a stamping or pressing operation in the manufacturing and, further, the parts being identical can be easily nested into one another and shipped from the manufacturer to the point of use, thus taking up less space.

Figure 2:
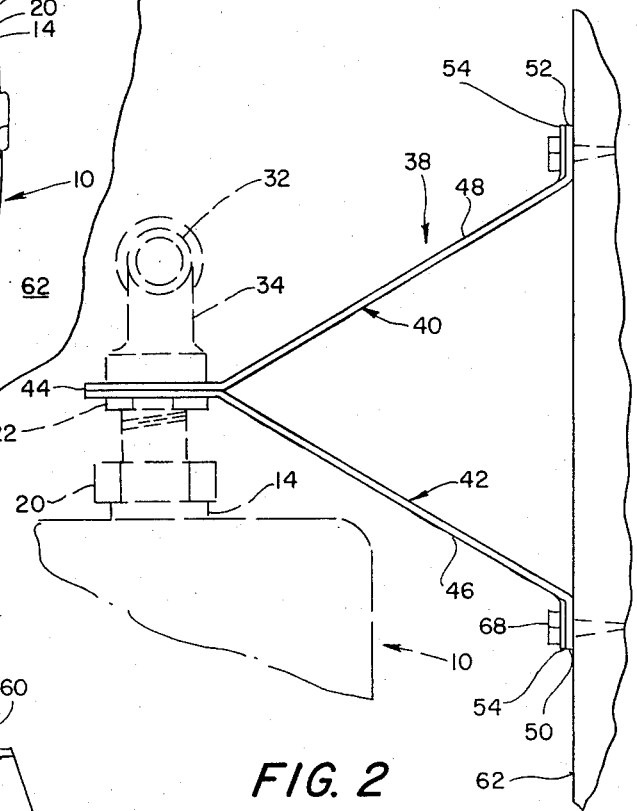
FIG. 2 is an enlarged side elevational view of the meter setting of FIG. 1 and showing the meter, elbows, and straight meter swivel members in broken lines.

The horizontally extending meter support member 44 is provided with a pair of completely enclosed horizontally spaced apertures 58 through which the exteriorly threaded ends of the meter swivel members 16 and 18 extend. By referring to FIG. 2 it will be noted that the elbows 34 and 36 are threaded onto these ends of the members 16 and 18 until they abut the upper surface of member 44 and then the jam nuts 22 are tightened to abut the lower surface so that the meter 10 is rigidly held in place relative to the elbows and the meter swivel members.

The lower flange 50 and the upper flange 52 are each provided with three horizontally spaced apertures or holes 60 therethrough. By providing three apertures 60 on each of the flanges 50 and 52, the meter support bracket 38 may be selectively mounted on either a wall 62 (FIGS. 1 and 2) or on channel-shaped posts 64 and 66 FIGS. 4–6 inclusive). In more detail and referring to FIGS. 1 and 2 when it is desired to mount the meter support bracket 38 directly on the wall 62, a pair of bolt means 68 extending through each of the flanges 50 and 52 in the outermost apertures 60 provide a rigid connection which resists torsion that may be caused by loads on the supply line 26 or by weight of the meter 10.

When it is desired to mount the bracket 38 on either of the channel-shaped posts 64 and 66, the two vertically aligned center holes or apertures 60 are arranged to receive a pair of vertically spaced bolt means 70 which also extend through a pair of vertically spaced holes 72 in the web 74 of the posts 64 or 66. It will be noted by reference to FIG. 5, the pair of horizontally spaced and vertically extending stiffening ribs 54 of both the lower and upper flanges 50 are spaced apart a distance equal to the distance between the side flanges 76 of the channel-shaped posts 64 or 66 so the flanges can be received therein. Such an arrangement, coupled with the vertically spaced bolts 70 functions to resist any torsion applied to the meter setting irregardless of whether the load is from the supply line 26 or weight of the meter 10.

In FIG. 4, the post 64 is shown mounted on a foundation or wall 78 by means of bolts 80 driven into the masonary by a "Ramset" gun or by some other suitable attachment means. The post 64 is provided with an offset portion 82 to provide room between it and the foundation 78 so that the meter support bracket member 38 can be easily attached thereto after erection of the post.

The post 66 shown in FIG. 6 is a straight channel-shaped post having its lower end 82 cut on the bias so that it may be driven into the ground prior to attachment of the meter support bracket member 38.

The terminology used in this specification is for the purpose of description and not limitation, the scope of the invention being defined in the claims.

What is claimed is:

1. A bracket for supporting a gas meter or the like from a wall or post, said bracket being V-shaped and made from two identical shaped pieces of sheet metal and comprising a horizontally extending meter support made of double thickness with one thickness being a portion of one piece and the other thickness being a portion of the other piece, said meter support member having spaced apertures therethrough for reception of conventional meter elbow members and straight meter swivel members, means to rigidly attach the one thickness of said meter support member to the other thickness to form the bracket, and a pair of diverging legs extending from the respective thicknesses of said meter support member and defining the other portions of each piece, each of said legs having a vertically extending flange at the free end thereof, the flange of one leg lying in the same vertical plane as the flange of the other leg, each of said flanges having apertures therethrough for receiving attachment means to attach the bracket to a wall or a post, and each of said flanges including a pair of horizontally spaced vertically extending stiffening ribs pressed therein and being vertically aligned, said ribs being spaced apart a distance to receive flanges of a channel-shaped post.

2. A meter bracket as claimed in claim 1 in which said attachment means is at least one rivet.

3. A bracket for supporting a gas meter or the like from a wall or a post, said bracket being V-shaped and made from two identically shaped pieces of sheet metal and comprising a horizontally extending meter support member made of double thickness, with one thickness being a portion of one piece and the other thickness being a portion of the other piece, said meter support member having spaced apertures therethrough for the reception of conventional meter elbow members and straight meter swivel members, means to rigidly attach the one thickness of said meter support member to the other thickness to form the bracket, and a pair of diverging legs extending from the respective thicknesses of said meter support member and defining the other portions of each piece, each of said legs having a vertically extending flange at the free end thereof, the flange of one leg lying in the same vertical plane as the flange of the other leg, each of said flanges having three horizontally spaced apart apertures and in which a center aperture of the three apertures of one flange is aligned vertically with a center aperture of the three apertures of the other flange, said center aperture of each flange being selected for use when attaching the bracket to a post and the outside apertures of each flange being selected for use when attaching the bracket to a wall.

4. A meter bracket as claimed in claim 3 in which the sheet metal is galvanized.

5. A meter bracket as claimed in claim 3 in which each of said flanges includes a pair of horizontally spaced vertically extending stiffening ribs pressed therein and being vertically aligned, said ribs being spaced apart a distance to receive flanges of a channel-shaped post.

6. A meter bracket as claimed in claim 3 in which said attachment means for attaching one thickness of said meter support member to the other thickness is at least one rivet.

* * * * *

UNITED STATES PATENT OFFICE
CERTIFICATE OF CORRECTION

Patent No. 3,815,859            Dated June 11, 1974

Inventor(s) Wilbur R. LEOPOLD, Jr.; John J. SMITH (Deceased)

It is certified that error appears in the above-identified patent and that said Letters Patent are hereby corrected as shown below:

In the heading of the front page format between "[76]" and "[22]", insert the following:

--[73] Assignee: Mueller Co., Decatur, Illinois--

Signed and sealed this 17th day of September 1974.

(SEAL)
Attest:

McCOY M. GIBSON JR.            C. MARSHALL DANN
Attesting Officer              Commissioner of Patents